(12) United States Patent
Chen et al.

(10) Patent No.: US 11,895,067 B2
(45) Date of Patent: Feb. 6, 2024

(54) MESSAGE RECALL AND UPDATING

(71) Applicant: Microsoft Technology Licensing, LLC, Redmond, WA (US)

(72) Inventors: Jun Chen, Redmond, WA (US); Philip Z. Loh, Seattle, WA (US); Jia Guo, Redmond, WA (US); Yue Ma, Renton, WA (US); Tania Albarghouthi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/845,561

(22) Filed: Jun. 21, 2022

(65) Prior Publication Data

US 2023/0412540 A1    Dec. 21, 2023

(51) Int. Cl.
*H04L 51/063*    (2022.01)

(52) U.S. Cl.
CPC .................. *H04L 51/063* (2013.01)

(58) Field of Classification Search
CPC ....... H04L 51/063; H04L 51/04; H04L 51/18; H04L 51/42; H04L 51/234; G06Q 10/107
See application file for complete search history.

(56) References Cited

U.S. PATENT DOCUMENTS

| | | | |
|---|---|---|---|
| 2004/0230642 A1* | 11/2004 | Collet | H04L 51/212 709/200 |
| 2005/0267937 A1* | 12/2005 | Daniels | G06Q 10/107 709/206 |
| 2007/0143408 A1* | 6/2007 | Daigle | H04L 51/04 709/206 |
| 2010/0036917 A1* | 2/2010 | McCaffrey | G06Q 10/107 709/206 |
| 2010/0250579 A1 | 9/2010 | Levow | |
| 2012/0198233 A1 | 8/2012 | George et al. | |
| 2015/0032832 A1* | 1/2015 | Chen | H04L 51/18 709/206 |
| 2015/0236990 A1* | 8/2015 | Shan | H04L 51/046 709/206 |
| 2016/0261549 A1* | 9/2016 | Freed | H04L 51/18 |
| 2018/0248838 A1* | 8/2018 | Systrom | H04L 51/212 |
| 2019/0075070 A1* | 3/2019 | Farrell | H04L 51/42 |

(Continued)

FOREIGN PATENT DOCUMENTS

| | | |
|---|---|---|
| EP | 0984593 A1 | 3/2000 |
| WO | 2019076215 A1 | 4/2019 |

OTHER PUBLICATIONS

"International Search Report and Written Opinion Issued in PCT Application No. PCT/US23/021092", dated Aug. 7, 2023, 17 Pages.

*Primary Examiner* — Johnny B Aguiar

(57) ABSTRACT

A secure data path enables sending and receiving message applications to transmit instructions for recalling a sent message and updating or deleting content of the recalled message in an inbox of a recipient. In response to a recall request from the sending message application over the secure channel, since the receiving message application has access to a recipient inbox, the receiving message application may process the recall request to update and/or delete content of a received message—even after a recipient has read the received message. Since the content of a received message may be updated or deleted in a recipient inbox, robust and reliable message recall is provided.

20 Claims, 9 Drawing Sheets

(56) References Cited

U.S. PATENT DOCUMENTS

| | | | |
|---|---|---|---|
| 2019/0379622 A1* | 12/2019 | Iyer | ........................ H04L 51/04 |
| 2020/0162411 A1 | 5/2020 | Deluca et al. | |
| 2021/0084001 A1* | 3/2021 | Goslar | .................. H04L 51/212 |

* cited by examiner

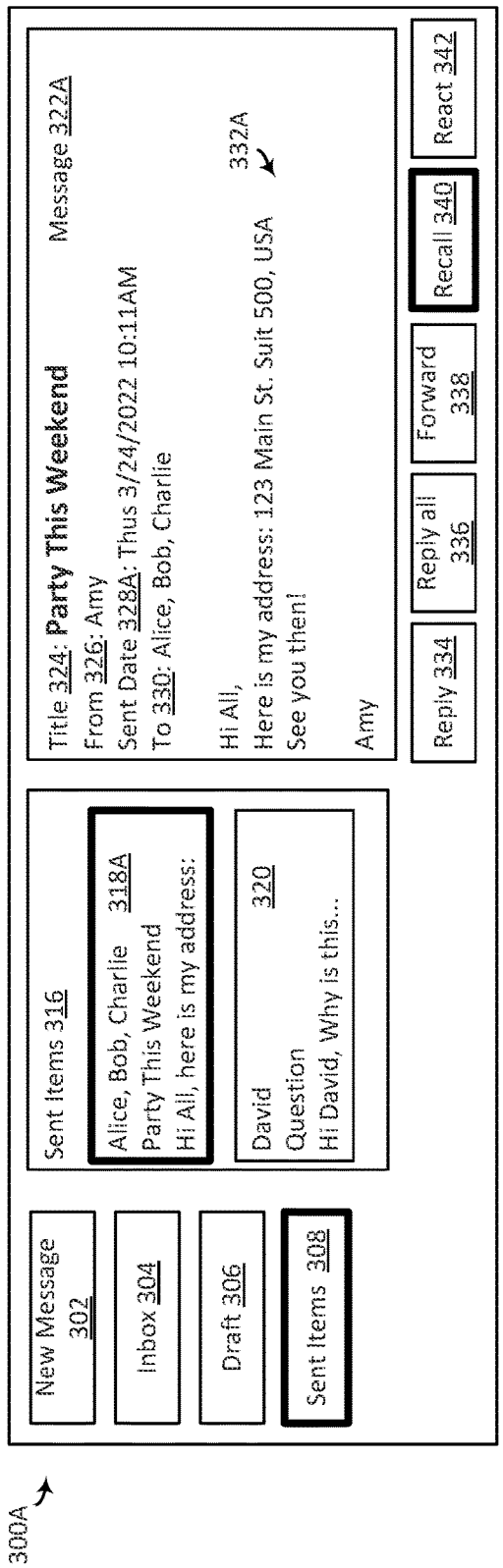
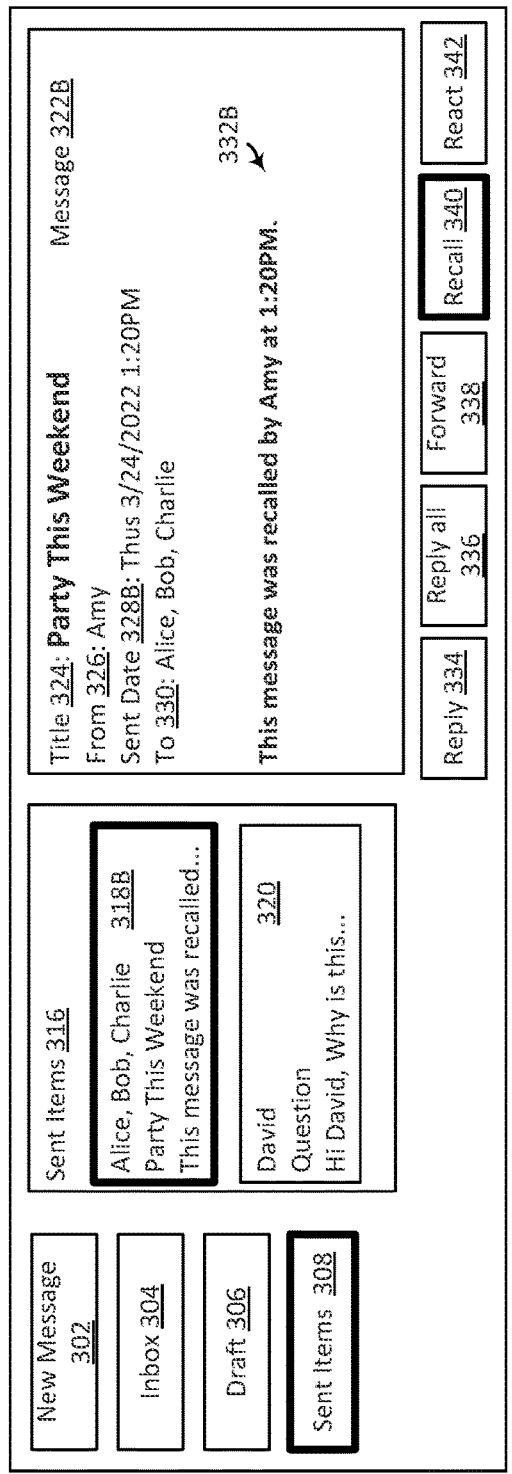
FIG. 3A
FIG. 3B

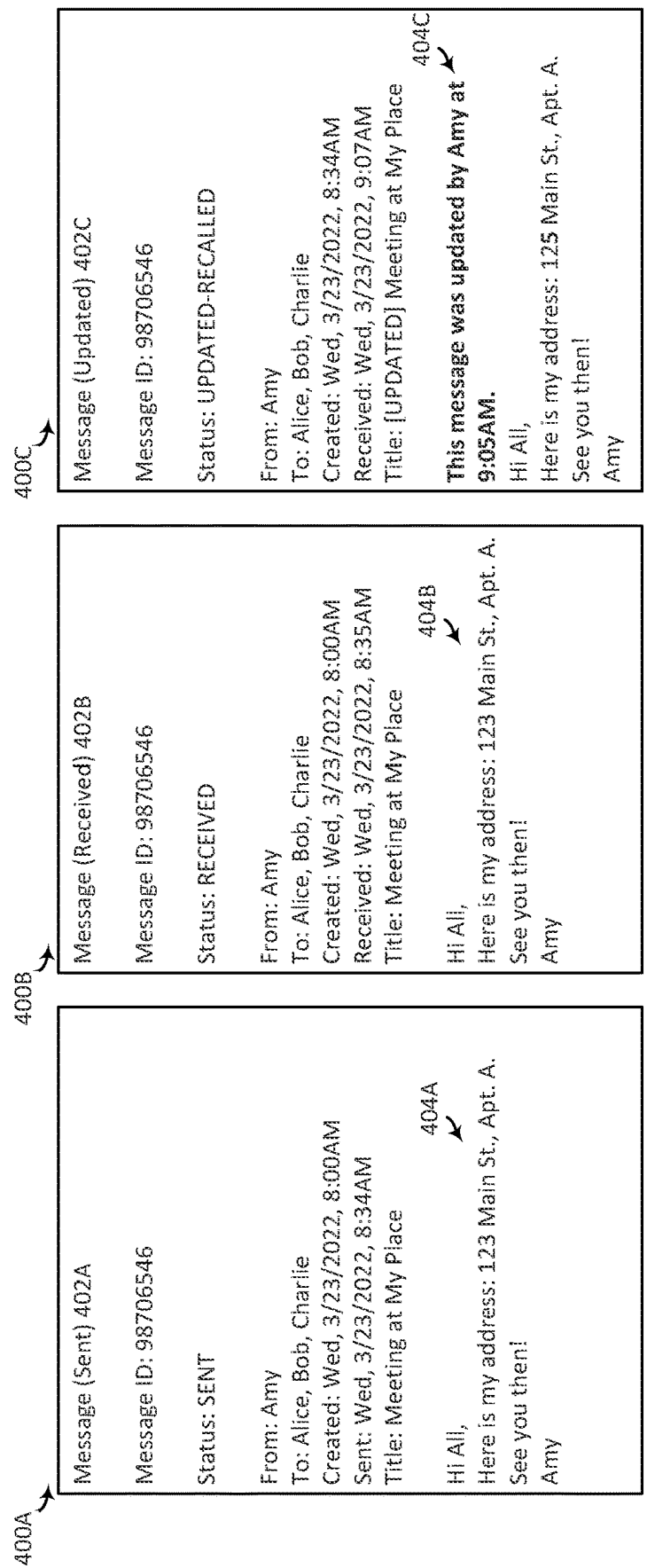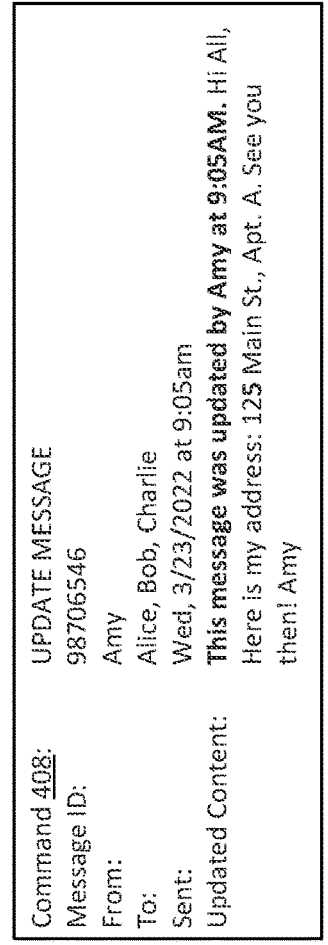
FIG. 4A
FIG. 4B
FIG. 4C
FIG. 4D

MESSAGE RECALL AND UPDATING

BACKGROUND

Recalling a message becomes important when a sender of the message wishes to rectify confusion among recipients of the message caused by content of the sent email by removing the message. A task of recalling a message is not simple because of a state of the message varies depending on recipients. One or more of the recipients may have already read and reacted to the message while some other recipients have not yet read the message. Some messaging systems may not allow the sender to access messages that have been delivered to inboxes of recipients because of a privacy of the recipients.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a method and a system for recalling a sent message. The method comprises receiving, from a sender by a sending message application, a request to update content of a sent message. The update request includes updated content for the sent message. The sending message application generates update instructions. The update instructions include a message identifier of the sent message and a command for updating a received message corresponding to the sent message with the updated content. The generating the update instruction causes a sending message server hosting the sending message application to transmit the update instructions via a secure data path to a receiving message server hosting a receiving message application. The secure data path establishes a privilege between the sending message server and the receiving message server for updating content of the received message. Based on the privilege, the sending message application causes the receiving message application hosted by the receiving message server to update the received message with the updated content in an inbox of a recipient according to the update instructions.

The update request specifies a recall of the sent message, and wherein the updated content replaces the content of the received message with a notification that the received message was recalled. Content of the sent message is updated with the updated content in a sent box of the sender by the sending message application. The updated content includes at least one of adding content, deleting content, or editing content of the sent message. The notification is based on a predefined template indicating that the sender recalled the message.

The update instructions are caused to be transmitted via a plurality of secure data paths to a plurality of receiving message servers, and wherein each of the plurality of secure data paths establishes a privilege between the sending message server and one of the plurality of receiving message servers for updating content of the received message. The privilege allows the sending message application hosted by the sending message server to cause the receiving message application hosted by the receiving message server to update content of the received message in the inbox of the recipient. At least one receiving message server of the plurality of receiving message servers hosts one or more receiving message applications associated with at least a first recipient and a second recipient of the plurality of recipients, and wherein the update instructions are transmitted via one secure data path between the sending message server and the at least one receiving message server.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-3B illustrate examples of graphical user interface in accordance with aspects of the present disclosure.

FIGS. 4A-4C illustrate examples of messages in accordance with aspects of the present disclosure.

FIG. 4D illustrates an example of a request instruction in accordance with aspects of the present disclosure

DETAILED DESCRIPTION

Figure 1:
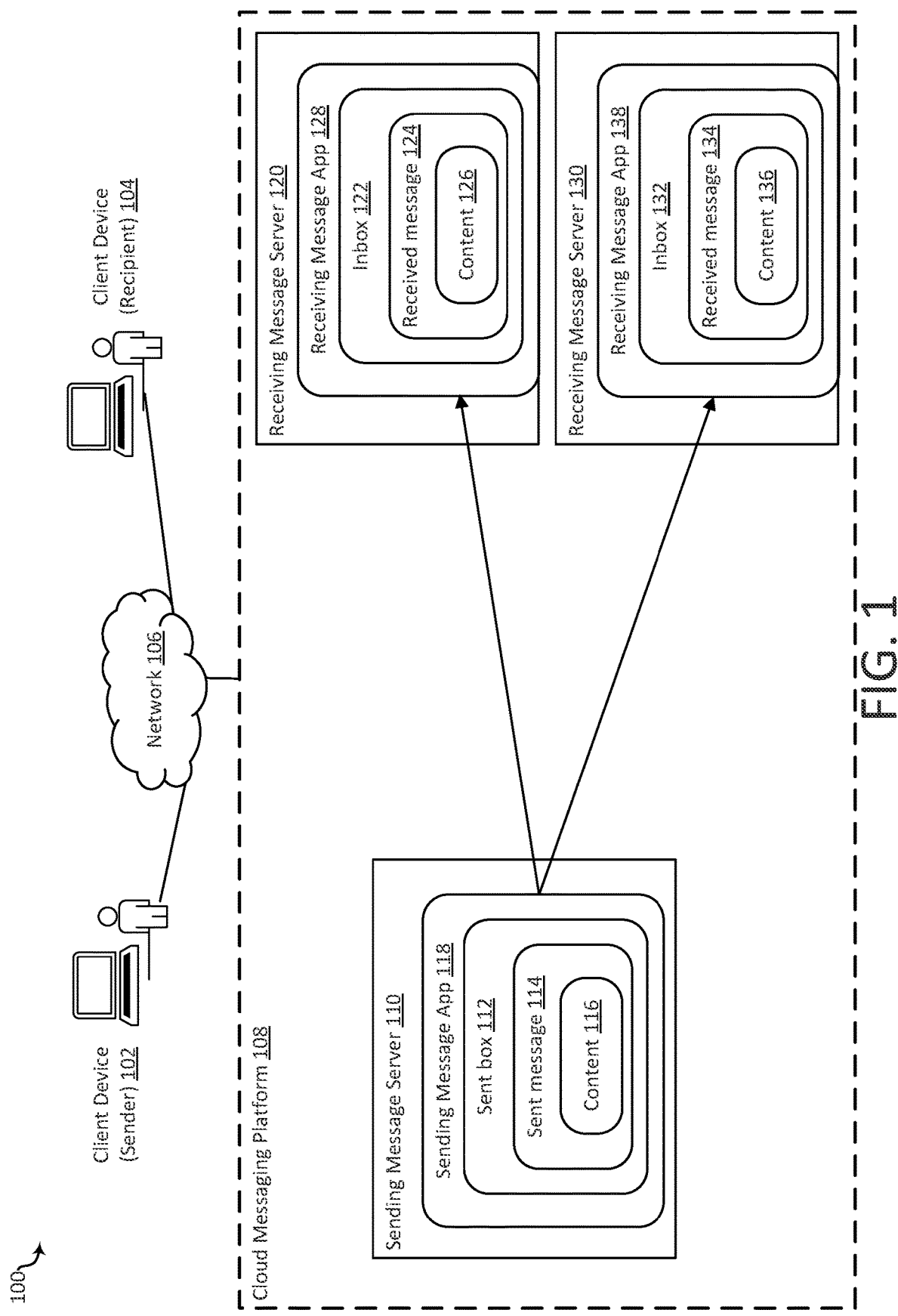
FIG. 1 illustrates an overview of an example system for recalling a message in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

In messaging, there are situations where a sender of a message wishes to recall or retract the sent message. For example, the sender might have sent a message with incorrect information or the message might have been inaccurate or inappropriate. Complexities of recalling a message arise because once a sending message server transmits the message to one or more recipient mail servers, the sending mail server no longer maintains control over the message. That is, the sending mail server and/or the sender may not have permissions to access a recipient inbox to recall (e.g., change or delete) a message once it has been received by the recipient. A state of the sent message may vary, including but not limited to an in-transit state, a delivered state, an unread state, a read state, a deleted state, a moved to folder state, and/or a forwarded state. In some examples, once a recipient has received and read a message, the request from the sender to recall the message may be moot.

There are further situations where either a sender or a receiver of a message may wish to append a message with another message or a marking (e.g., a reaction) after the message has been sent and/or received. An example of a reaction includes an icon (e.g., thumbs up, thumbs down, heart, exclamation, etc.), an emoji (e.g., smiling face, sad face, etc.), a text message (e.g., "Well Done!" or "Thanks!"). Processing the reaction to a message is distinct from processing a conventional reply to a message. For instance, a reaction is appended to the original sent message rather than being a separate reply message.

The disclosed technology uses secure data paths that fan out from the sending message server to one or more receiving message server(s). The secure data path enables the sending and receiving message servers to communicate with one another, e.g., for transmitting a recall request and changed or deleted content of a recalled message. In aspects disclosed herein, a sending message server creates one or more copies of a message for transmission to one or more receiving message servers, which store a copied message in an inbox of each recipient. The secure data path authenticates the sending message server and the receiving message server(s) and establishes a secure and reliable communication channel for updating and/or recalling sent messages. In aspects, the sending message server use a secure data path between the sending message server and a receiving message server. The sending message server may transmit, using the secure data path, messages that include recall requests of a sent message to a plurality of recipients, whose respective inboxes are maintained by a receiving message application that is hosted by the receiving message server. In response to a recall request from the sending message server over the secure channel, since the receiving message server has access to a recipient inbox, the receiving message server processes the recall request to update and/or delete content of a received message — even after a recipient has read the received message. In aspects, the receiving message server retains previous versions of the received message according to a message retention policy. Since the content of a sent message may be updated or deleted in a recipient inbox, the present disclosure enables robust and reliable message recall over traditional methods of recalling messages.

FIG. 1 illustrates an overview of an example system for recalling messages in accordance with aspects of the present disclosure. The system 100 includes a client device (sender) 102, a client device (recipient) 104, a network 106, and a cloud messaging platform 108.

A first user (e.g., sender) interacts with the client device (sender) 102 to create and send a message directed to one or more second users (e.g., recipients). In aspects, the first user (sender) interactively drafts and transmit a message to at least one second user (recipient). The first user further interactively views and accesses messages stored in various folders (or "boxes), including but not limited to a draft folder, a sent box, and an inbox. The draft folder stores messages that have been drafted but not yet sent by the first user. The sent box stores messages that have been sent by the first user. The inbox may store messages that have been received by the first user. In some examples, the first user (sender) interacts with the client device (sender) 102 to connect to the cloud messaging platform 108 via the network 106. In aspects, messages in the inbox, the sent box, and other boxes may be stored in the cloud message platform 108.

In some aspects, the first user interacts with the client device (sender) 102 to request a recall of a sent message, for instance, by selecting a recall control in a sent message. In some other aspects, the first user interacts with the client device (sender) 102 to initiate a request to react to a sent message. Examples of the reaction include an icon (e.g., thumbs up, thumbs down, heart, exclamation, etc.), an emoji (e.g., smiling face, sad face, etc.), a text message (e.g., "Well Done!" or "Thanks!"), or the like, that expresses a reaction by the first user as the sender of the message.

In further aspects, the second user (recipient) interacts with client device (receiver) 104 to receive, read, and possibly reply to a received message. For instance, the second user receives incoming messages into an inbox associated with the second user. In some other aspects, the second user interacts with client device (receiver) 104 to interactively request to react to the received message. Examples of the reaction include an icon (e.g., thumbs up, thumbs down, heart, exclamation, etc.), an emoji (e.g., smiling face, sad face, etc.), a text message (e.g., "Well Done!" or "Thanks!"), or the like, that expresses a reaction by the second user to the received message. In aspects, a user may continually switch between a first user (sender) and a second user (recipient) when sending messages, recalling messages, receiving messages and/or reacting to messages.

The cloud messaging platform 108 may process messages in the cloud. In an example, the cloud messaging platform 108 includes a sending message server 110, a first receiving message server 120 and a second receiving message server 130. In aspects, for purposes of the example illustrated by FIG. 1, the messaging servers are referred to as "sending" or "receiving," but it should be appreciated that the messaging servers is either or both of a sending or a receiving server in different examples or contexts. The respective messaging servers host message applications to accommodate one or more users for sending and/or receiving messages. For instance, the sending message server 110 hosts a sending message application 118 for the first user. In this example, the sending message application 118 is labeled as "sending" (although sending message application 118 may also be a receiving message application in a different context) for purposes of discussion and clarity. In aspects, sending message application 118 provides a user interface for composing a message, storing a draft message, sending a message, receiving a message, reviewing a message, and the like. The interface may include additional functionality enabling the sender to initiate a recall request for a sent message and to update or delete content of the sent message, as described further with respect to FIG. 2.

While the sender is drafting a message, the message may be stored by the sending message application 118 in a draft folder, as described above. As soon as the sender transmits the message to the first and second recipients, it may be stored in a sent box 112. In an example, the sent box 112 includes at least one sent message 114, which in this example was sent from the sender to at least two recipients. The sent message 114 includes content 116.

As illustrated, the first receiving message server 120 host a first receiving messaging application 128, which provide a first inbox 122 corresponding to a first recipient. The first inbox 122 includes a first received message 124, which corresponds to the sent message 114 transmitted by the sender to the first recipient. The first received message 124 includes content 126, corresponding to content 116 of the sent message 114.

The second receiving message server 130 hosts a first receiving messaging application 128, which provides a second inbox 132 corresponding to a second recipient. The second inbox 132 includes a second received message 134, which corresponds to the sent message 114 transmitted by the sender to the second recipient. The second received message 134 includes content 136, corresponding to content 116 of the sent message 114.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
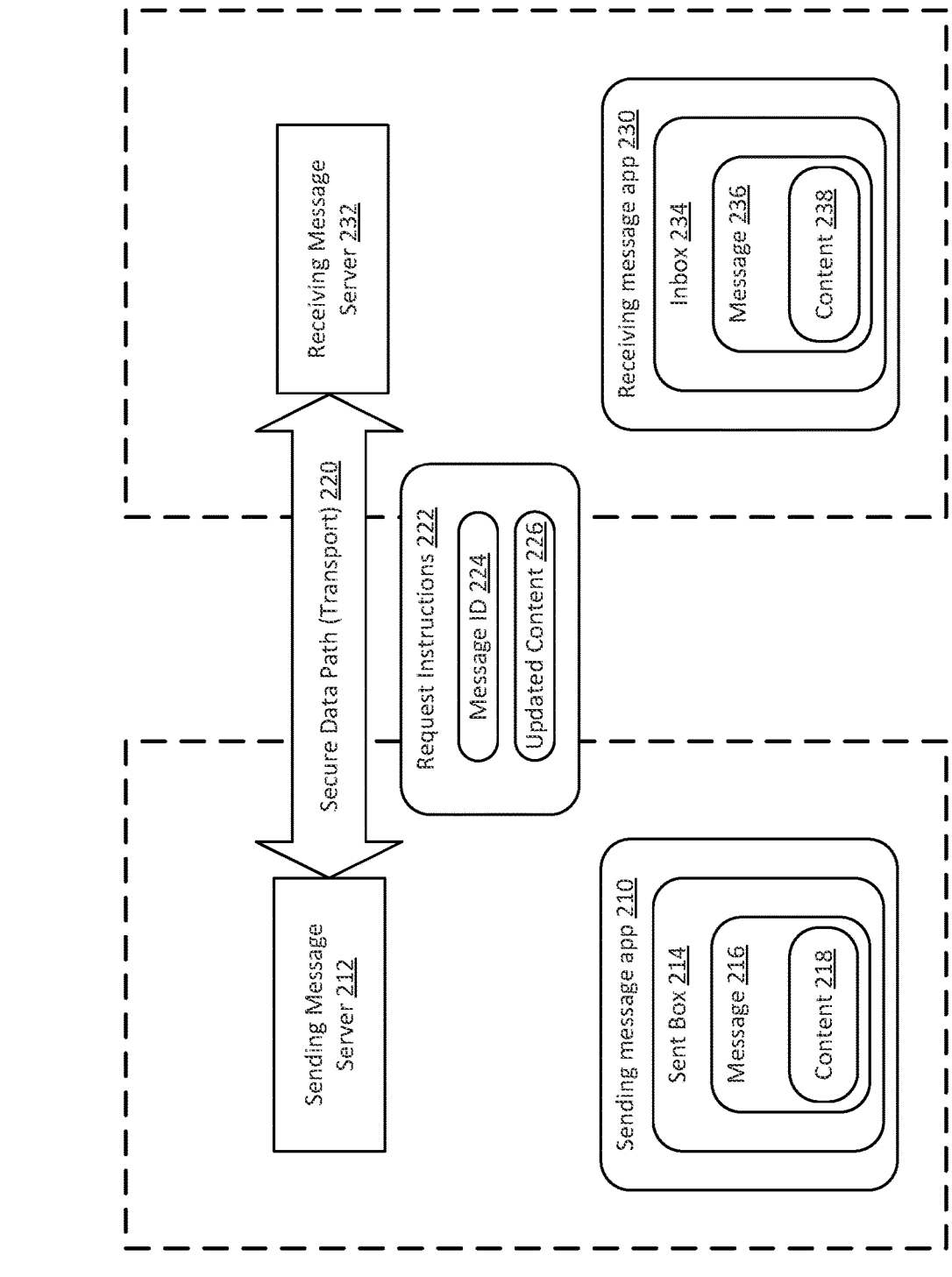
FIG. 2 illustrates an overview of an example system in accordance with aspects of the present disclosure.

FIG. 2 illustrates an overview of an example system for recalling messages in accordance with aspects of the present disclosure. In aspects, the system 200 may be similar to the cloud messaging platform 108 described above with respect to FIG. 1. The system 200 may include a sending message server 212 hosting a sending message application 210 for a first user (e.g., sender) and a receiving message server 232 hosting a receiving message application 230 for a second user (e.g., recipient). As illustrated, sending message application 210 comprises a sent box 214 for the first user, including a sent message 216 having content 218. Additionally, receiving message application 230 comprises an inbox 234 for the second user, including a received message 236 having content 238.

In aspects, the sending message application 210 and the receiving message application may communicate to transmit and receive messages via a cloud network (e.g., cloud network 106) established between sending message server 212 and receiving message server 232, for example. In some cases, the sending message application 210 and the receiving message application communicate via an application programming interface (API). The API may be associated with authentication services, for example. In this way, the sending message server 212 and receiving message server 232 may authenticate one another to establish a trusted relationship for sending and receiving messages. In further aspects, a secure data path 220 may be established between the sending message server 212 and the receiving message server 232. In an example, the secure data path 220 is established based on authentication services provided by the API. However, rather than sending and receiving messages, the secure data path 220 enables instructions 222 to be passed between a sending message application 210 hosted by a sending message server 212 and a receiving message application 230 hosted by a receiving message server 232. The instructions 222 may be trusted based on the authentication provided by the API utilized for transmitting messages or additional security measures. In some cases, the secure data path 220 establishes a heightened level of privilege for modifying at least a sent message in a sent box of a sender or a received message in an inbox of a recipient. For example, the instructions 222 relate to adding, deleting, or editing content in a received message in a recipient inbox, adding a reaction to a sent message in a sender sent box, and the like.

As described above, a sender may initiate a recall request for a sent message, e.g., sent message 216. For example, the sending message application 210 receives a request to recall the sent message 216 based on a sender selecting a recall control or button provided in the sent message 216, or based on a selection from a popup, drop-down, messaging toolbar, and the like. In some examples, in response to receiving the recall request, the sending message application 210 provides the content 218 of the sent message 216 in an editable state to the sender. In other examples, the sending message application 210 presents a recall template including the content 218 of the sent message 216 and fields for inputting one or more recipients of the sent message 216. For example, the sender deletes and replace the content 218 with a recall notice (e.g., "This message has been recalled by the sender."). In other examples, the sender updates or changes the content 218 (e.g., change address "123 Elm Street" to "125 Elm Street).

In aspects, a subset of the original recipients may be selected for message recall by the sender. In response to receiving an update to the content 218, the sending message application 210 generates instructions 222 to receiving message application 230 for a specified recipient. The instructions 222 includes at least a message identifier 224 of the sent message 216 and the updated content 226, for example. The instructions 222 may further be formatted or packaged for transmission over secure data path 220 to receiving message application 230 associated with the specified recipient. Based on the trusted relationship between the sending message server 212 and the receiving message server 232, the receiving message application 230 hosted by the receiving message server 232 is able to process the instructions 222 received from the sending message application 210 hosted by the sending message server 212. In particular, the receiving message application 230 may replace the content 238 with the updated content 226 in the received message 236 in the recipient's inbox 234.

As further described above, a recipient may initiate a reaction request to the received message 236. Based on the user-initiated request, the receiving message application 230 generates instructions 222 for reacting to the message directed to the sending message application 210 on the sending message server 212. For example, the receiving message application 230 receives a request to react to the received message 236 based on a reaction control or button provided in the received message 236, or based on a selection from a popup, drop-down, messaging toolbar, and the like. For instance, the receiving message application 230 provides a gallery of reactions for selection by a user, e.g., icons (e.g., thumbs up, thumbs down, heart, exclamation, etc.), emojis (e.g., smiling face, sad face, etc.), text messages (e.g., "Well Done!" or "Thanks!"), Gifs (e.g., images), or the like. For example, the recipient selects to "like" the received message 236.

The receiving message application 230 may then generate instructions 222 to sending message application 210. The instructions 222 includes at least a message identifier 224 of the receive message 236 and the updated content 226. In this example, it should be appreciated that the message identifier for a message may be the same whether it is residing in a sent box of the sender or an inbox of a recipient. Additionally, for purposes of this example, the updated content 226 refers to either updated content for a recalled sent message or updated content of a reaction to a received message. The instructions 222 may further be formatted or packaged for transmission over secure data path 220 to sending message application 210 associated with the sender. Based on the trusted relationship between the sending message server 212 and the receiving message server 232, the sending message application 210 hosted by the sending message server 212 is able to process the instructions 222 received from the receiving message application 230 hosted by the receiving message server 232. In particular, the sending message application 210 may update the content 218 with the updated content 226 (e.g., icon) in sent message 236 in sent box 214.

In aspects, not limiting to those illustrated in FIG. 2, the receiving message server 232 may host more receiving message apps in addition to the receiving message app 230. Similarly, the receiving message app 230 may comprise more inboxes associated with additional recipients of the sent email, in addition to the inbox 234 associated with the recipient (e.g., the second user). Accordingly, the sending message server 212 may transmit a plurality of recall requests for the sent message 216 respectively to the recipient with the inbox 234 and the additional recipients with respective inboxes through the secure data path 220 to the receiving message server 232.

FIGS. 3A-B illustrate examples of graphical user interface in accordance with aspects of the present disclosure. In particular, FIG. 3A illustrates an example graphical user interface with a message recall input button. The graphical user interface 300A includes a set of buttons with labels for switching content for displaying. The set of buttons may include new message 302, inbox 304, draft 306, and sent messages 308. The new message 302 displays a screen for creating a new message. The inbox 304 displays messages and content of one of the messages in the inbox. The draft 306 displays a message being drafted. The sent messages 308 display a list of sent messages and content of one of the sent messages. In an example, the sent messages 308 button is selected. Accordingly, the graphical user interface 300A includes sent messages list 316 and content of one of the sent messages 322A. In the example, the sent messages list 316 lists two sent messages. A first sent message 318A was sent to Alice, Bob, and Charlie. A title of the first sent message 318A is "Party This Weekend." The first sent message 318A further displays a portion of content "Hi All, here is my address:" A second sent message 320 was sent to David with a title "Question," and with content including "Hi David, why is this . . . "

The graphical user interface 300A further displays a sent message 322A, representing details of the first sent message 318A. The details include a title 324, "Party This Weekend," from sender 326 "Amy," on sent date 328A of Thurs 3/24/2022 at 10:11 AM, to recipient(s) 330, "Alice, Bob, and Charlie." The message body 332A (e.g., content) recites, "Hi All, Here is my address: 123 Main St., Apt. A. See you then! Amy."

The graphical user interface 300A further displays a set of buttons for the sender to interactively act upon the sent message 322A. The set of buttons includes reply 334 for creating a reply message, reply all 336 for creating a reply message to all the recipients of the sent message 322A, a forward 338 for forwarding the sent message 322A, recall 340 to recall the sent message 322A, and a react 342 to react to the sent message. In the example, Amy the sender 326 has realized that the address information in her sent message was incorrect. Accordingly, Amy has selected the recall button 340 to recall the sent message 322A. The recall button 340 is highlighted to indicate that the recall button 340 has been interactively selected.

FIG. 3B illustrates an example of graphical user interface after the sent message 322B has been recalled based on a request by the sender 326. In aspects, the sent messages list 316 includes the first sent message 318B, indicating that the first sent message 318B was recalled. The detailed display of the recalled sent message 322B, which corresponds to the first sent message 318B, indicates an updated sent date 328B of Thurs, 3/24/2022 at 1:20 PM and updated content 332B deletes the text of content 332A and indicates that the sent message 332B has been recalled, "This message was recalled by Amy at 1:20 PM." In aspects, other attributes of the message 322B including title 324, "Party This Weekend" remains the same after the sent message 322B has been recalled.

FIGS. 4A-4F illustrate examples of messages and instructions to recall messages in accordance with aspects of the present disclosure. FIG. 4A illustrates a sent message 400A. FIG. 4B illustrates a received message 400B. FIG. 4C illustrates a recalled message 400C of the sent message 400A. FIG. 4D illustrates an example recall instruction 400D to recall the message. FIG. 4E illustrates an example instruction to update the content of the originally sent message. FIG. 4F illustrates an example message that has been updated by the sender.

FIG. 4A illustrates an example of a sent message 400A. The sent message 400A includes a header Message (Sent) 402A, a message identifier 98706546, a status "SENT," from "Amy," to "Alice, Bob, and Charlie," a sent time of Wednesday, Mar. 23, 2022 at 8:34 am. The sent message 400A has a title, "Meeting at My Place," with a message body 404A (e.g., content), "Hi All, Here is my address: 123 Main St., Apt. A. See you then! Amy."

Similarly, FIG. 4B illustrates an example of a received message 400B. The received message 400B includes a header Message (Received) 402B and a message identifier 98706546, which corresponds to message identifier of the sent message 400A. The received message 400B has a status of, "RECEIVED," from "Amy," to "Alice, Bob, and Charlie," a created time of Wednesday, Mar. 23, 2022 at 8:34 am, a received time of Wednesday, Mar. 23, 2022 at 8:35 am. The received message 300B has a title, "Meeting at My Place," with a message body 404B (e.g., content), "Hi All, Here is my address: 123 Main St., Apt. A. See you then! Amy."

In this example, Amy the sender may realize that the address in the sent message 400A was incorrect and Amy decides to recall the sent message 400A at 9:05 AM. However, in this example, Amy updates the sent message 400A with the correct address.

FIG. 4C illustrates an example of the updated message 400C as appearing in the inbox of the recipient of the original received message 400B. The updated message 400C includes a header Message (Updated) 402C, a message identifier 9876546, a status "UPDATED—RECALLED," from "Amy," to "Alice, Bob, and Charlie," a created time of Wednesday, Mar. 23, 2022, at 8:34 am, and a received date of Wednesday, Mar. 23, 2022, at 9:07 am. In this case, the title has been updated to indicate "[UPDATED] Meeting at My Place." In this case, rather than indicating that the message has been recalled, the message body 404C specifies, "This message was updated by Amy at 9:05 AM." Additionally, the message body 404C includes the updated content, "Hi All, Here is my address: 125 Main St., Apt. A. See you then! Amy." In some aspects, changes to the original content are bolded, redlined, or highlighted, e.g., the "5" in the address may be highlighted to indicate the update.

FIG. 4D illustrates an example of an instruction for recall a message in accordance with aspects of the present disclosure. An update instruction 406 includes a command 408 indicating, "UPDATE MESSAGE," specifying a message identifier of 98706546, from "Amy," to "Alice, Bob and Charlie," a sent time of the update instruction 406 of Wednesday, Mar. 23, 2022 at 9:05 AM. The update instruction 406 includes a notification of the update, "This message was updated by Amy at 9:05 AM." In aspects, the notification is based on a predefined template "This message was updated/recalled by <sender name> at <Time>," with placeholders to replace with values before sending the update instruction 406. Additionally, the update instruction 406 may include updated content, "Hi All, Here is my address: 125 Main St., Apt. A. See you then! Amy."

In aspects, the sending message application (e.g., sending message application 210) hosted by sending message server (e.g., the sending message server 212 as shown in FIG. 2) generates the update instruction 406 based on a request received from the sender and transmits the update instruction 406 to a receiving message application (e.g., receiving message application 230) hosted by a receiving message server (e.g., receiving message server 232 as shown in FIG. 2) via a secure data path (e.g., the secure data path 220 as shown in FIG. 2) between the sending message server and the receiving message server.

Figure 5A:
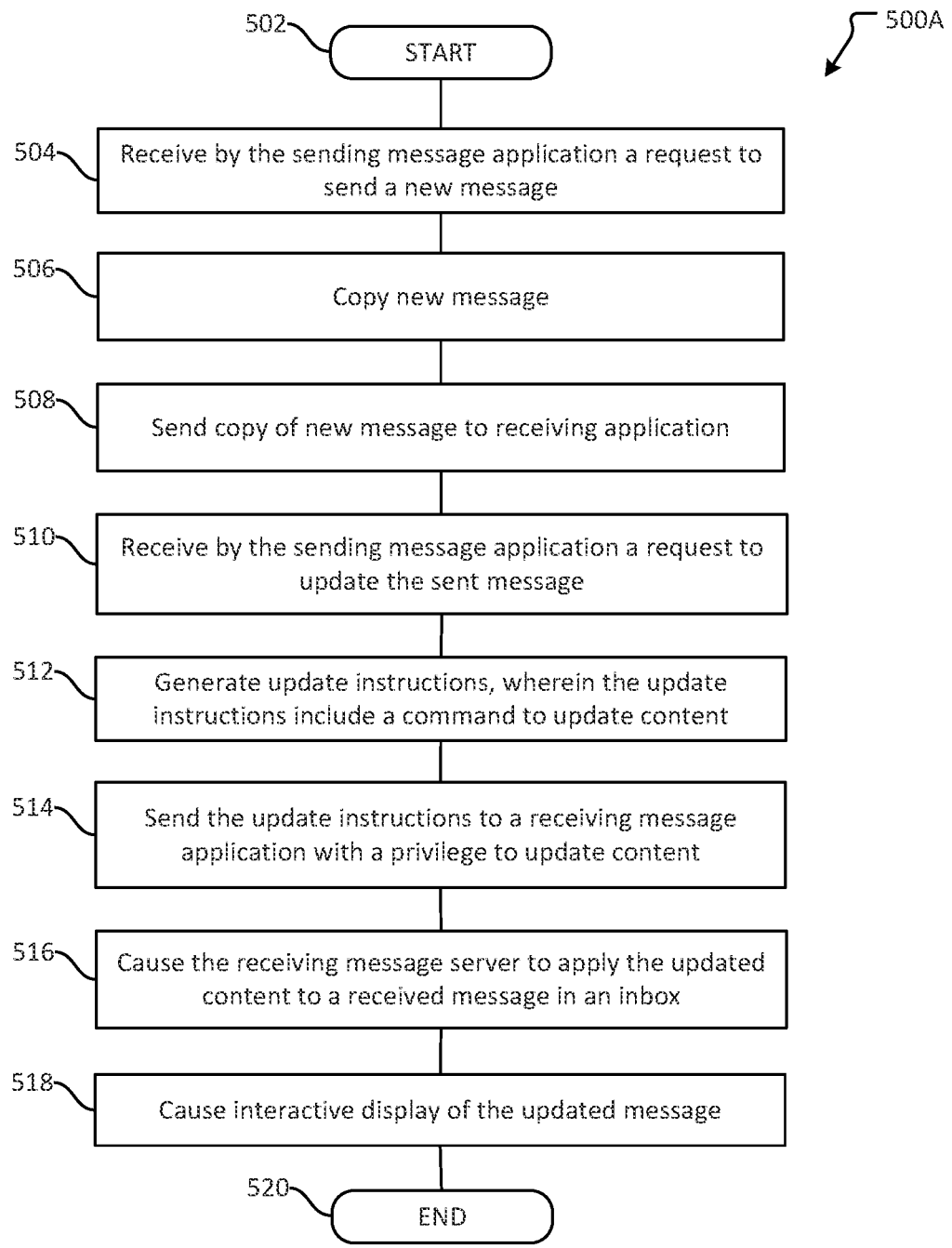
FIG. 5A illustrates an example of a method for recalling a message in accordance with aspects of the present disclosure.

FIG. 5A illustrates an example of a method for updating a sent message in accordance with aspects of the present disclosure. A general order of the operations for the method 500A is shown in FIG. 5A. Generally, the method 500A begins with start operation 502 and ends with end operation 524. The method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1, 2, 3, 4A-F, 5B, 6, and 7A-B.

Following start operation 502, the method 500A begins with receive operation 504, in which a sending message application (e.g., the sending message application 210 as shown in FIG. 2) receives a request to send a new message. In aspects, the sending message application is hosted by a sending message server (e.g., sending message server 232). For instance, the new message is received via a compose interface provided by the sending message application. The new message includes a title, one or more recipients, and a message body (e.g., content).

At copy operation 506, the sending message application may assign a message identifier (e.g., the message identifier 98706546 as shown in FIGS. 4A) to the new message and generate copies of the new message for transmission to the one or more recipients.

At send copy operation 508, the copies of the new message may be sent from the sending message application to one or more receiving message applications. In aspects, the sending message application and the receiving message application send and receive messages via a cloud network established between the sending message server and the receiving message server, for example. In some cases, the sending message application and the receiving message application communicate messages via an application programming interface (API). In aspects, once the message has been transmitted, the sending message application stores the new message as a sent message in the sent box of the sender. Similarly, the receiving message application for each recipient receives the copy of the new message and store the received message in an inbox of the recipient.

At receive operation 510 the sending message application may receive a request to update content of the sent message. For example, the sending message application may receive a request to recall or update the sent message based on the sender selecting a recall or update control or button provided in the sent message, or based on a selection from a popup, drop-down, messaging toolbar, or the like. In some examples, in response to receiving the update request, the sending message application provides the content of the sent message in an editable state to the sender. In other examples, the sending message application presents a template including the content of the sent message and fields for inputting one or more recipients. In some cases, when the update request is a recall, the sender deletes and replace the content with a recall notice (e.g., "This message has been recalled by the sender."). In other examples, the update request includes updating or editing the content (e.g., change address "123 Main Street" to "125 Main Street).

At generate operation 512, the sending message application may generate update instructions based on the update request. The update instructions may include a message identifier corresponding to the sent message, one or more recipients, and a command to update content of a received message corresponding to the sent message. For example, the command includes deleting and replacing the content of the received message with a recall notice (e.g., "This message has been recalled by the sender."). In other examples, the command may include updating or editing the content of the received message (e.g., change address "123 Main Street" to "125 Main Street).

At send update instructions 514, the sending message application may send the update instructions to the receiving message application(s). In aspects, the update instructions are sent via a secure data path established between the sending message server and the receiving message server(s). The secure data path is privileged to allow instructions to be implemented between the sending message application hosted by the sending message server and the receiving message application hosted by the receiving message server. Transmitted instructions are trusted based on the privilege and authentication (e.g., provided by an API) between the sending message server and the receiving message server. In some cases, the privilege allows modifying content of at least a sent message in a sent box of a sender or a received message in an inbox of a recipient.

At cause update operation 516, the update instructions may cause the receiving message application to apply the change to the content of the received message corresponding to the sent message in the recipient's inbox. As described above, a recall command may instruct the receiving message application to delete and replace the content in the received message with a recall notice (e.g., "This message has been recalled by the sender."). In other examples, an update command may instruct the receiving message application to update or change the content (e.g., change address "123 Main Street" to "125 Main Street). Based on the privileged relationship between the sending message server and the receiving message server, the receiving message application may apply the update instructions in the recipient's inbox. As notification to the recipient, the recalled (or updated)

message in the recipient's inbox may include a sender's name and a time of the recall.

At display operation 518, the recalled (or updated) message may be displayed in the sent box of the sender and in the inbox of the one or more recipients. The method 500A may end with the end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5B:
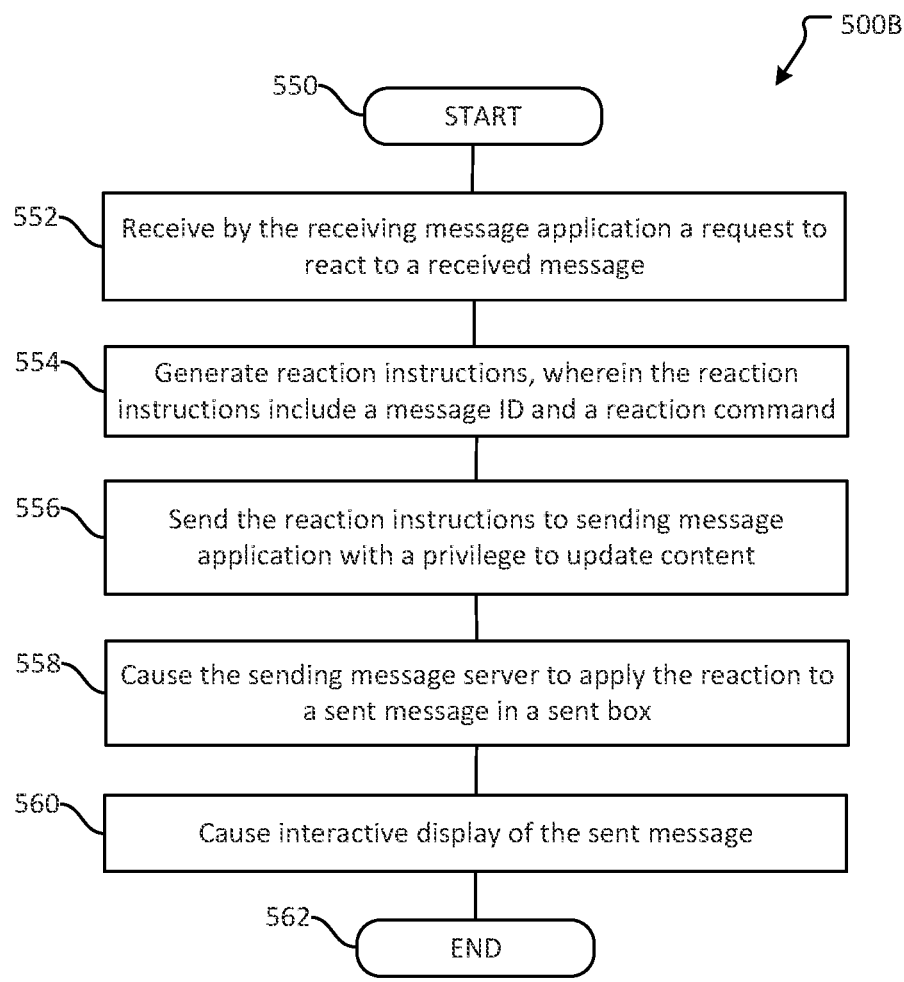
FIG. 5B illustrates an example of a method for updating a reaction associated with a message in accordance with aspects of the present disclosure.

FIG. 5B illustrates an example of a method for processing a reaction to a received message in accordance with aspects of the present disclosure. A general order of the operations for the method 500B is shown in FIG. 5B. Generally, the method 500B begins with start operation 550 and ends with end operation 570. The method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, signaling diagrams, methods, etc., described in conjunction with FIGS. 1, 2, 3, 4A-F, 5A, 6, and 7A-B.

Following start operation 550, the method 500B starts with receive operation 552, in which a receiving message application (e.g., the receiving message application 230 as shown in FIG. 2) receives a request to react to a received message. For example, the receiving message application receives a request to react to the received message based on a reaction control or button provided in the received message, or based on a selection from a popup, drop-down, messaging toolbar, or the like. For instance, the receiving message application provides a gallery of reactions for selection by a user, e.g., icons (e.g., thumbs up, thumbs down, heart, exclamation, etc.), emojis (e.g., smiling face, sad face, etc.), text messages (e.g., "Well Done!" or "Thanks!"), Gifs (e.g., images), or the like. For example, the recipient selects to "like" the received message.

At generate operation 554, the receiving message application may generate reaction instructions based on the reaction request. The reaction instructions may include a message identifier corresponding to the received message and a reaction command including the recipient's reaction (e.g., "like") to the received message. For example, a reaction command specifies that a reaction (e.g., "like") should be applied to the sent message in the sender's sent box.

At send reaction instructions 556, the receiving message application may send the reaction instructions to the sending message application. In aspects, the reaction instructions may be sent via a secure data path established between the receiving message server and the sending message server. The secure data path may be privileged to enable instructions to be implemented between the sending message application (hosted by the sending message server) and the receiving message application (hosted by the receiving message server). Transmitted instructions may be trusted based on the privilege and authentication (e.g., provided by an API). In some cases, the privilege allows modification of content of at least a sent message in a sent box of a sender or a received message in an inbox of a recipient.

At cause reaction operation 558, the reaction instructions may cause the sending message application to apply the reaction to content of the sent message in the sender's sent box. As described above, reactions may be in the form of icons (e.g., thumbs up, thumbs down, heart, exclamation, etc.), emojis (e.g., smiling face, sad face, etc.), text messages (e.g., "Well Done!" or "Thanks!"), Gifs (e.g., images), or the like. In this example, the recipient's reaction (e.g., "like") may be applied to the sent message in the sender's sent box. Based on the privileged relationship between the sending message server and the receiving message server, the sending message application may apply the reaction to the sent message in the sender's sent box. As notification to the sender, the sent message in the sender's sent box may include a recipient's name associated with the reaction.

At display operation 560, the message including the reaction may be displayed in the sent box of the sender and in the inbox of the recipient. The method 500B may end with the end operation 562.

As should be appreciated, operations 550-562 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
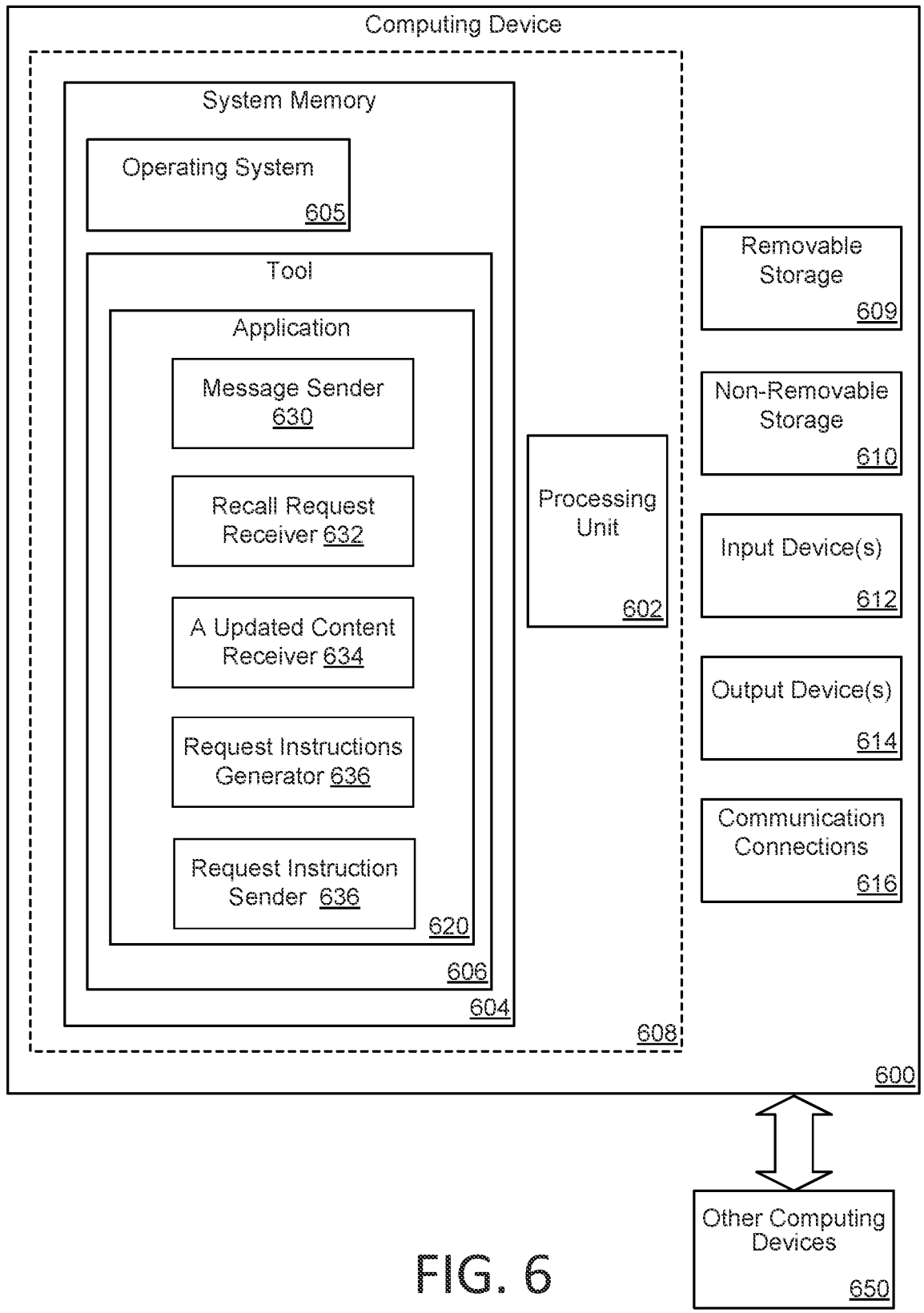
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes a message sender 630, a recall request receiver 632, an updated content receiver 634, a request instruction generator 636, and a request instruction sender 638 as described in more details in FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
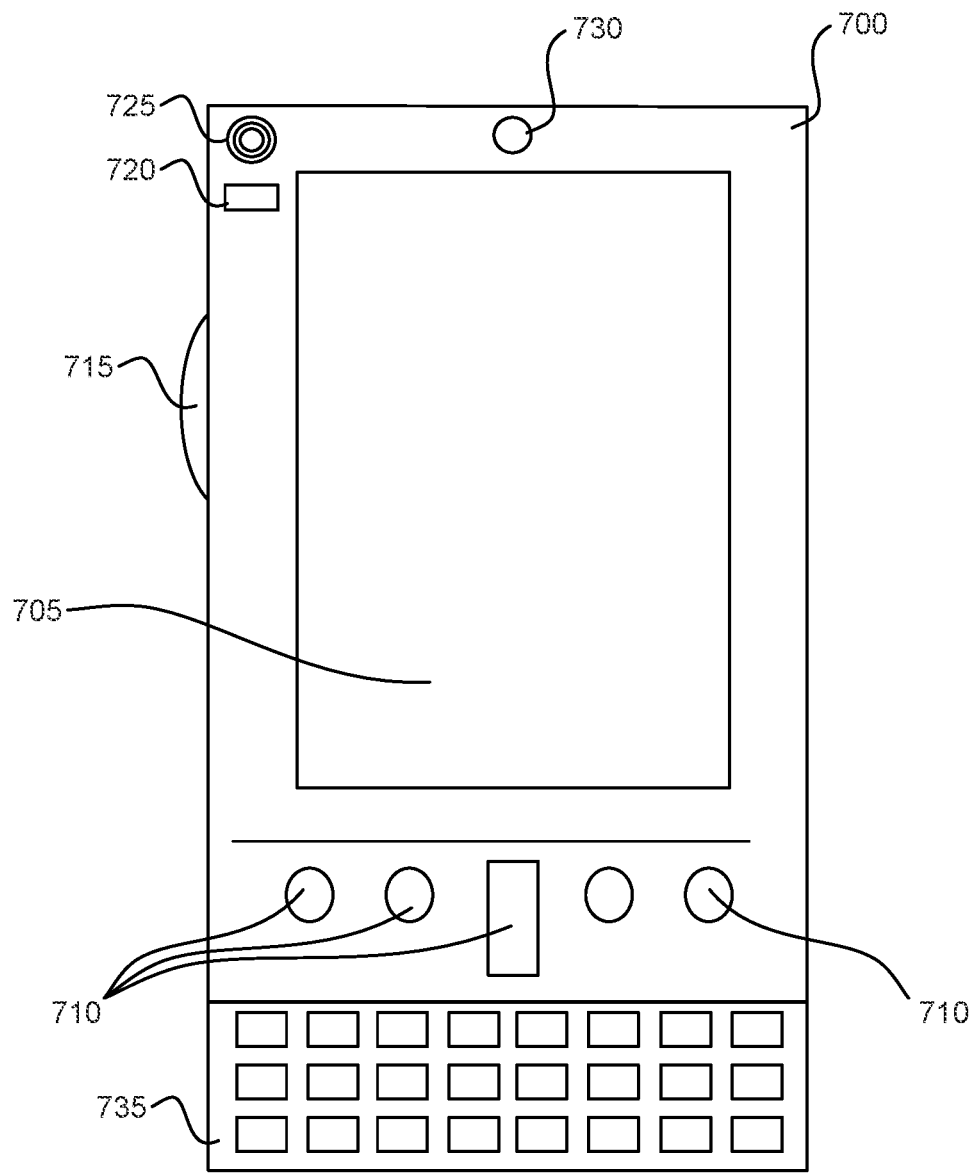
FIG. 7A is a simplified diagram of a mobile computing device with which aspects of the present disclosure may be practiced.
Figure 7B:
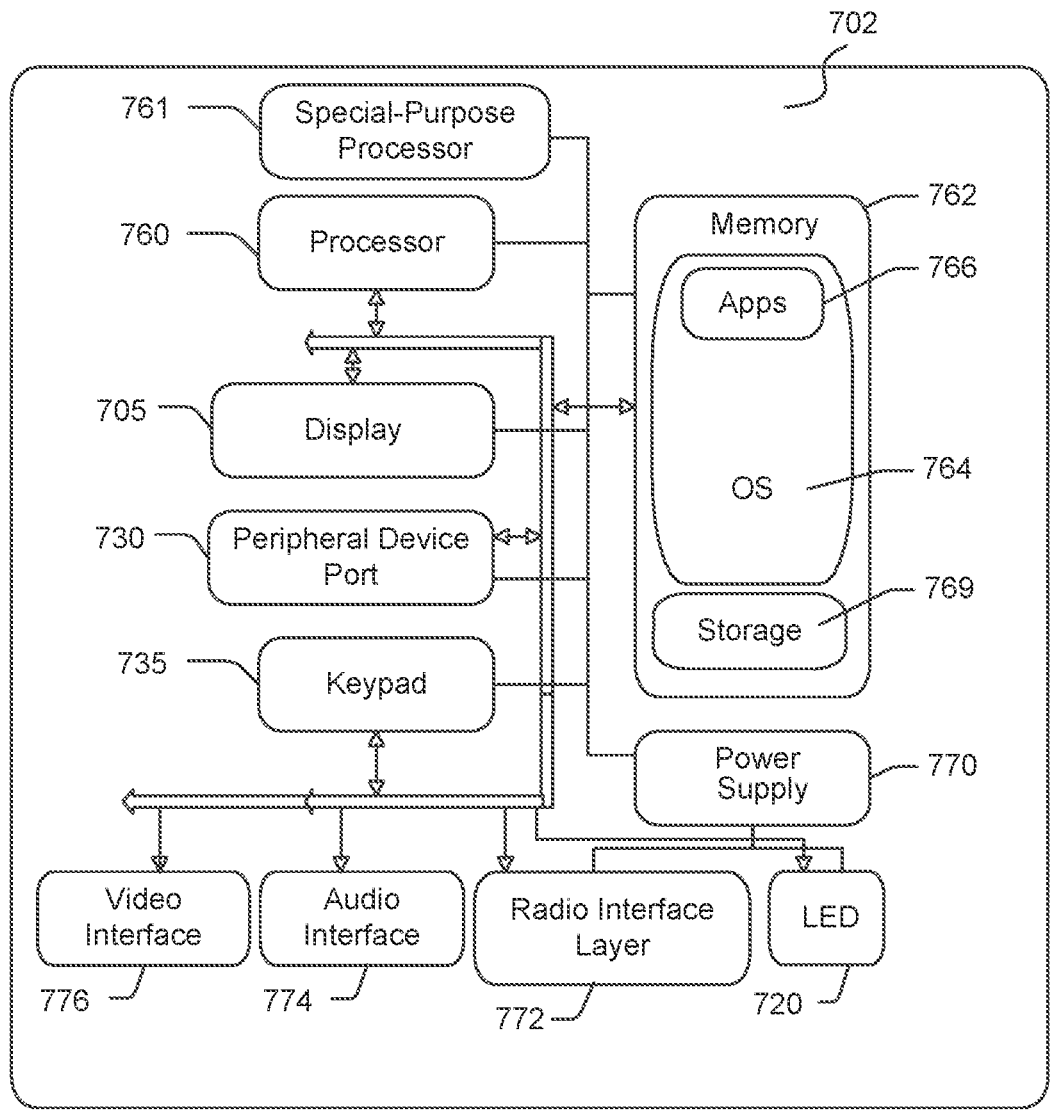
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the client device (sender) 102 and the client device (receiver) 104 as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., a message server (with sender box) 110 and a receiving message server (with inbox) 120, as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for recalling a message according to at least the examples provided in the sections below. The method comprises receiving, from a sender by a sending message application, a request to update content of a sent message, wherein the update request includes updated content for the sent message; generating update instructions, wherein the update instructions include a message identifier of the sent message and a command for updating a received message corresponding to the sent message with the updated content; causing a sending message server hosting the sending message application to transmit the update instructions via a secure data path to a receiving message server hosting a receiving message application, wherein the secure data path establishes a privilege between the sending message server and the receiving message server for updating content of the received message; and based on the privilege, causing the receiving message application hosted by the receiving message server to update the received message with the updated content in an inbox of a recipient according to the update instructions. The update request specifies a recall of the sent message, and wherein the updated content replaces the content of the received message with a notification that the received message was recalled. Content of the sent message is updated with the updated content in a sent box of the sender by the sending message application. The updated content includes at least one of adding content, deleting content, or editing content of the sent message. The notification is based on a predefined template indicating that the sender recalled the message. The update instructions are caused to be transmitted via a plurality of secure data paths to a plurality of receiving message servers, and wherein each of the plurality of secure data paths establishes a privilege between the sending message server and one of the plurality of receiving message servers for updating content of the received message. The privilege allows the sending message application hosted by the sending message server to cause the receiving message application hosted by the receiving message server to update content of the received message in the inbox of the recipient. The update instructions further include one or more of an update time, or a name of the sender.

Another aspect of the technology relates to a system. The system comprises a processor; and a memory storing computer-executable instructions that when executed by the processor cause the system to execute a method. The method comprises receiving, from a first recipient by a first receiving message application, a request to update content of a first received message, wherein the request includes a recipient reaction to the first received message; generating update instructions, wherein the update instructions include a message identifier of the first received message and a command for updating a sent message corresponding to the first received message with the recipient reaction; causing a first receiving message server hosting the first receiving message application to transmit the update instructions via a first secure data path to a sending message server hosting a sending message application, wherein the first secure data path establishes a privilege between the first receiving message server and the sending message server for updating content of the sent message; and based on the privilege, causing the sending message application hosted by the sending message server to update the sent message in a sent box of a sender with the recipient reaction according to the update instructions. The recipient reaction indicates a name of the recipient. The computer-executable instructions further cause the system to execute a method comprising generating update instructions, wherein the update instructions include the message identifier of the first received message and a command for updating a second received message corresponding to the first received message with the recipient reaction; causing the first receiving message server hosting the first receiving message application to transmit the update instructions via a second secure data path to a second receiving message server hosting a second receiving message application, wherein the second secure data path establishes a privilege between the first receiving message server and the second receiving message server for updating content of the second received message; and based on the privilege, causing the second receiving message application hosted by the second receiving message server to update the second received message with the recipient reaction in an inbox of a second recipient according to the update instructions. The sending message server is different from the first receiving message server. The first secure data path authenticates the first receiving message application to the sending message application. The privilege allows the first receiving message application hosted by the first receiving message server to cause the sending message application hosted by the sending message server to update the sent message stored in the sent box of the sender with the recipient reaction.

In still further aspects, the technology relates to a computer-implemented method. The method comprises receiving, from a sender by a sending message application, a request to update content of a sent message, wherein the update request includes updated content; generating update instructions, wherein the update instructions include a message identifier of the sent message and a command for updating a plurality of received messages corresponding to the sent message with the updated content; causing a sending message server hosting the sending message application to transmit the update instructions via a plurality of secure data paths to a plurality of receiving message servers hosting a plurality of receiving message applications, wherein each of the plurality of secure data paths establishes a privilege between the sending message server and one of the plurality of receiving message servers for updating content of the plurality of received messages; based on each privilege, causing the plurality of receiving message applications hosted by the plurality of receiving message servers to update the plurality of received messages with the updated content in inboxes of recipients according to the update instructions; and updating the sent message with the updated content in a sent box of the sender. The update request specifies a recall of the sent message, and wherein the updated content replaces the content of the received message with a notification that the received message was recalled. The updated content includes at least one of adding content, deleting content, or editing content of the sent message. The update instructions further include one or more of an update time, or a name of the sender. At least one receiving message server of the plurality of receiving message servers hosts one or more receiving message applications associated with at least a first recipient and a second recipient of the plurality of recipients, and wherein the update instructions are transmitted via one secure data path between the sending message server and the at least one receiving message server. Each privilege allows the sending message application hosted by the sending message server to cause each of the plurality of receiving message applications hosted by the plurality of receiving message servers to update content of the plurality of received messages in the inboxes of the recipients.

Any of the one or more above aspects in combination with any other of the one or more aspect. Any of the one or more aspects as described herein.

What is claimed is:

1. A computer-implemented method, the method comprising:
    receiving, from a sender by a sending message application, a request to update content of a sent message, wherein the update request includes updated content for the sent message;
    generating first update instructions, wherein the first update instructions include a message identifier of the sent message and a command for updating a first received message corresponding to the sent message with the updated content;
    generating second update instructions, wherein the second update instructions include the message identifier of the first received message and a command for updating a second received message corresponding to the first received message with a recipient reaction;
    causing a sending message server hosting the sending message application to transmit the first update instructions via a secure data path to a first receiving message server hosting a first receiving message application, wherein the secure data path establishes a first privilege between the sending message server and the first receiving message server for updating content of the first received message;
    causing the first receiving message server hosting the first receiving message application to transmit the second update instructions via a second secure data path to a second receiving message server hosting a second receiving message application, wherein the second secure data path establishes a second privilege between the first receiving message server and the second receiving message server for updating content of the second received message;
    based on the first privilege, causing the first receiving message application hosted by the first receiving message server to update the first received message with the updated content in an inbox of a recipient according to the first update instructions; and based on the second privilege, causing the second receiving message application hosted by the second receiving message server to update the second received message with the recipient reaction in an inbox of a second recipient according to the second update instructions.

2. The computer-implemented method of claim 1, wherein the update request specifies a recall of the sent message, and wherein the updated content replaces the content of the first received message with a notification that the first received message was recalled.

3. The computer-implemented method of claim 2, wherein the notification is based on a predefined template indicating that the sender recalled the first received message.

4. The computer-implemented method of claim 1, wherein content of the sent message is updated with the updated content in a sent box of the sender by the sending message application.

5. The computer-implemented method of claim 1, wherein the updated content includes at least one of adding content, deleting content, or editing content of the sent message.

6. The computer-implemented method of claim 1, wherein the first update instructions are caused to be transmitted via a plurality of secure data paths to a plurality of receiving message servers, and wherein each of the plurality of secure data paths establishes a privilege between the sending message server and one of the plurality of receiving message servers for updating content of the first received message.

7. The computer-implemented method of claim 6, wherein the privilege allows the sending message application hosted by the sending message server to cause the first receiving message application hosted by the first receiving message server to update content of the first received message in the inbox of the recipient.

8. The computer-implemented method of claim 1, wherein the first update instructions further include one or more of:
an update time, or
a name of the sender.

9. The computer-implemented method of claim 1, wherein the sending message server is different from the first receiving message server.

10. A system comprising:
a processor; and
a memory storing computer-executable instructions that when executed by the processor cause the system to execute a method comprising:
receiving, from a first recipient by a first receiving message application, a request to update content of a first received message, wherein the request includes a recipient reaction to the first received message;
generating first update instructions, wherein the first update instructions include a message identifier of the first received message and a command for updating a sent message corresponding to the first received message with the recipient reaction;
generating second update instructions, wherein the second update instructions include the message identifier of the first received message and a command for updating a second received message corresponding to the first received message with the recipient reaction;
causing a first receiving message server hosting the first receiving message application to transmit the first update instructions via a first secure data path to a sending message server hosting a sending message application, wherein the first secure data path establishes a first privilege between the first receiving message server and the sending message server for updating content of the sent message;
causing the first receiving message server hosting the first receiving message application to transmit the second update instructions via a second secure data path to a second receiving message server hosting a second receiving message application, wherein the second secure data path establishes a second privilege between the first receiving message server and the second receiving message server for updating content of the second received message;
based on the first privilege, causing the sending message application hosted by the sending message server to update the sent message in a sent box of a sender with the recipient reaction according to the first update instructions; and
based on the second privilege, causing the second receiving message application hosted by the second receiving message server to update the second received message with the recipient reaction in an inbox of a second recipient according to the second update instructions.

11. The system of claim 10, wherein the recipient reaction indicates a name of the first recipient.

12. The system of claim 10, wherein the sending message server is different from the first receiving message server.

13. The system of claim 10, wherein the first secure data path authenticates the first receiving message application to the sending message application.

14. The system of claim 10, wherein the first privilege allows the first receiving message application hosted by the first receiving message server to cause the sending message application hosted by the sending message server to update the sent message stored in the sent box of the sender with the recipient reaction.

15. A computer-implemented method comprising:
receiving, from a sender by a sending message application, a request to update content of a sent message, wherein the update request includes updated content;
generating first update instructions, wherein the first update instructions include a message identifier of the sent message and a command for updating a plurality of received messages corresponding to the sent message with the updated content, wherein the plurality of received messages includes a first received message;
generating second update instructions, wherein the second update instructions include the message identifier of the first received message and a command for updating a second received message corresponding to the first received message with a recipient reaction;
causing a sending message server hosting the sending message application to transmit the first update instructions via a plurality of secure data paths to a plurality of receiving message servers hosting a plurality of receiving message applications, wherein each of the plurality of secure data paths establishes a first privilege between the sending message server and one of the plurality of receiving message servers for updating content of the plurality of received messages, the plurality of receiving message servers includes a first receiving message server and a second receiving message server, and the plurality of receiving message applications includes a first receiving message application and a second receiving message application;

causing the first receiving message server hosting the first receiving message application to transmit the second update instructions via a second secure data path to the second receiving message server hosting the second receiving message application, wherein the second secure data path establishes a second privilege between the first receiving message server and the second receiving message server for updating content of the second received message;

based on each privilege between the sending message server and each receiving message servers of the plurality of receiving message servers, causing the plurality of receiving message applications hosted by the plurality of receiving message servers to update the plurality of received messages with the updated content in inboxes of recipients according to the first update instructions;

based on the second privilege, causing the second receiving message application hosted by the second receiving message server to update the second received message with the recipient reaction in an inbox of a recipient according to the second update instructions; and updating the sent message with the updated content in a sent box of the sender.

16. The computer-implemented method of claim 15, wherein the update request specifies a recall of the sent message, and wherein the updated content replaces the content of the plurality of received messages with a notification that the plurality of received messages were recalled.

17. The computer-implemented method of claim 15, wherein the updated content includes at least one of adding content, deleting content, or editing content of the sent message.

18. The computer-implemented method of claim 15, wherein the first update instructions further include one or more of:
an update time, or
a name of the sender.

19. The computer-implemented method of claim 18, wherein said each privilege allows the sending message application hosted by the sending message server to cause each of the plurality of receiving message applications hosted by the plurality of receiving message servers to update content of the plurality of received messages in the inboxes of the recipients.

20. The computer-implemented method of claim 15, wherein at least one receiving message server of the plurality of receiving message servers hosts one or more receiving message applications associated with at least a first recipient and a second recipient of a plurality of recipients, and wherein the first update instructions are transmitted via one secure data path between the sending message server and the at least one receiving message server.

* * * * *